United States Patent [19]

Kanbara

[11] Patent Number: 5,689,737
[45] Date of Patent: Nov. 18, 1997

[54] SHAKE DETECTION DEVICE, SHAKE RECORDING DEVICE AND ACCOMPANYING EQUIPMENT

[75] Inventor: Tetsuro Kanbara, Sakai, Japan

[73] Assignee: Minolta Co., Ltd., Osaka, Japan

[21] Appl. No.: 604,729

[22] Filed: Feb. 21, 1996

[30] Foreign Application Priority Data

Feb. 24, 1995 [JP] Japan .................................. 7-036610

[51] Int. Cl.⁶ .......................... G03B 17/24; G01D 9/42
[52] U.S. Cl. .................. 396/52; 396/315; 346/7; 346/46; 346/107.2
[58] Field of Search ..................... 354/105, 106, 354/410, 430, 70, 202; 346/7, 46, 107.2, 107.1, 107.6; 396/50, 310, 317, 315, 52, 53

[56] References Cited

U.S. PATENT DOCUMENTS

| | | | |
|---|---|---|---|
| 2,580,485 | 1/1952 | Thornton | 346/7 |
| 2,936,207 | 5/1960 | Beaumont et al. | 346/46 X |
| 3,143,389 | 8/1964 | Dransfield | 346/46 X |
| 4,433,338 | 2/1984 | Nagakawa et al. | 346/46 X |
| 4,956,652 | 9/1990 | Onozato | 346/46 X |
| 5,030,984 | 7/1991 | Buckler et al. | 354/430 |
| 5,365,303 | 11/1994 | Yamasaki et al. | 354/430 |

FOREIGN PATENT DOCUMENTS 63-187883 8/1988 Japan.
1-125068 5/1989 Japan.

*Primary Examiner*—W. B. Perkey
*Attorney, Agent, or Firm*—Sidley & Austin

[57] ABSTRACT

Light source 1 is mounted to camera body 10 via supporting member 2. The image from optical system 11 is recorded on the film inside photo-taking frame 12. The light beam from the light source is recorded in an area outside the photo-taking frame as its brightness or wavelength or both are made to change over time. Image processing is conducted at the time of development based on this recorded data in the area outside the photo-taking frame so that the information pertaining to shaking may be canceled out.

27 Claims, 9 Drawing Sheets

SHAKE DETECTION DEVICE, SHAKE RECORDING DEVICE AND ACCOMPANYING EQUIPMENT

BACKGROUND OF THE INVENTION

1. Field of the Invention

The present invention pertains to a device that detects the shaking of equipment held in the hands. It also pertains to a device that records the shaking of equipment held in the hands. Further, the present invention pertains to equipment accompanying these devices.

2. Description of Related Art

Conventionally, devices that detect or record the shaking of equipment together with accompanying equipment have been proposed. For example, in the area of devices to film images, various devices that correct for blurriness of the image that occurs during image sensing when the device is not fixed using a tripod, etc., but is held in the hands, have been disclosed. In Japanese Laid-Open Patent Sho 83-187883, for example, technology in which the amount of shake is measured using a CCD (charge coupled device) or an acceleration sensor and the output thereof is recorded on silver salt film, a recording medium, via a transference circuit has been proposed.

However, with such a conventional image sensing device, such things as a CCD, an optical system for said CCD, an analog/digital (hereinafter 'A/D') conversion system, an image memory and a circuit for transference are needed, which necessitates complex construction and requires that there be a large amount of space inside the image sensing device, which therefore leads to a large image sensing device. Second, because a light source having a fixed brightness and a wavelength is used, changes in the image over time that are transferred in the recording medium cannot be easily related to the shaking movements.

SUMMARY OF THE INVENTION

The object of the present invention is to obtain a superior shake detection device or a shake recording device.

Another object of the present invention is to obtain equipment accompanying a superior shake detection device or a shake recording device.

Yet another object of the present invention is to obtain a shake detection device or a shake recording device having a simple construction.

Yet another object of the present invention is to obtain equipment accompanying a shake detection device or a shake recording device having a simple construction.

Yet another object of the present invention is to obtain a device capable of recording both the amount and direction of the shake or equipment accompanying said device and to obtain said device or equipment using a simple construction.

Yet another object of the present invention is to obtain a device capable of detecting shake and recording the amount and direction of the shake or equipment accompanying said device and to obtain said device or equipment using a simple construction.

In order to attain these objects, an embodiment of the present invention comprises a light source whose wavelength and brightness change over time and a recording means that records the light beam emitted from this light source on a recording medium.

Said light source may be held by a supporting member such that its position relative to said recording medium may change.

The embodiment may also include a detection means that detects the change in position of said light source relative to said recording medium and a position changing means that changes the position of said light source by means of said supporting member in response to the output of said detection means.

Said detection means and position changing means may include piezoelectric elements.

These and other objects, advantages and features of the invention will become apparent from the following description thereof taken in conjunction with the accompanying drawings, which illustrate specific embodiments of the invention.

BRIEF DESCRIPTION OF THE DRAWINGS

In the following description, like parts are designated by like reference numbers throughout the several drawings.

DETAILED DESCRIPTION OF THE PREFERRED EMBODIMENTS

Figure 1:
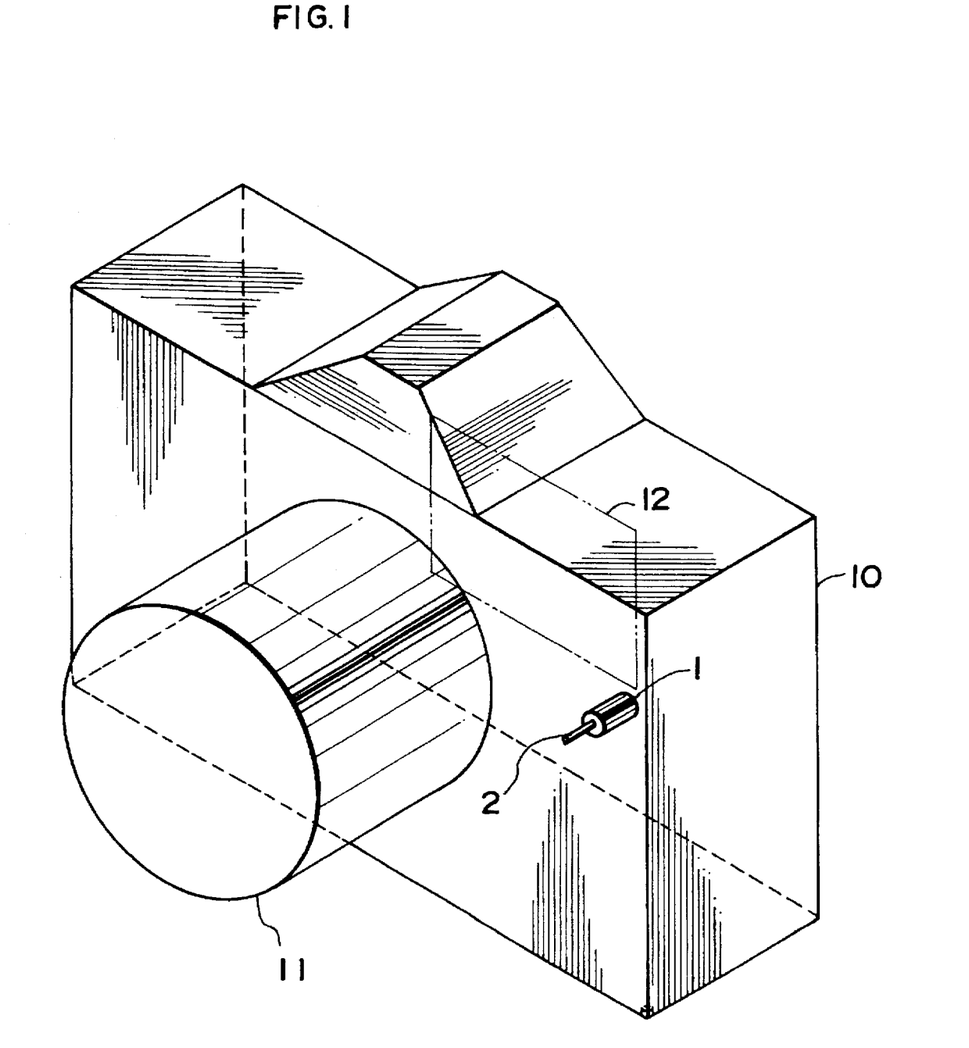
FIG. 1 shows a first embodiment of the present invention. It shows a shake detection device and a shake recording device and the entire accompanying equipment.

An image sensing device of the present invention is explained below with reference to the drawings. The first embodiment in which the devices of the present invention are applied in a still camera will first be explained. FIG. 1 shows the entire construction of the camera of the first embodiment. In this drawing, 10 is the camera body, 11 is a lens system and 12 is an image frame. These are the same as those in public domain cameras. This embodiment is characterized in that light source 1, held by elastic supporting member 2, is situated inside camera body 10.

Figure 2A:
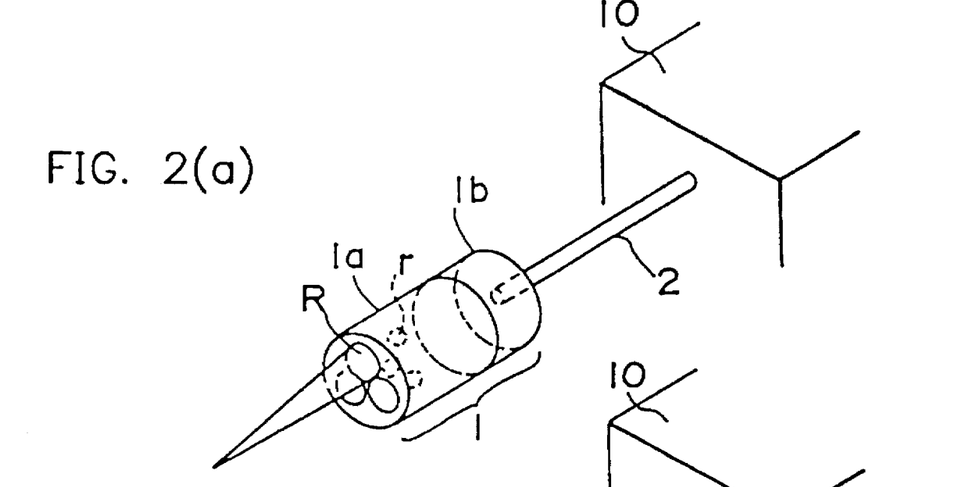
FIGS. 2(a), 2(b), and 2(c) show important parts of the devices and equipment shown in FIG. 1.
Figures 2B, 2C:
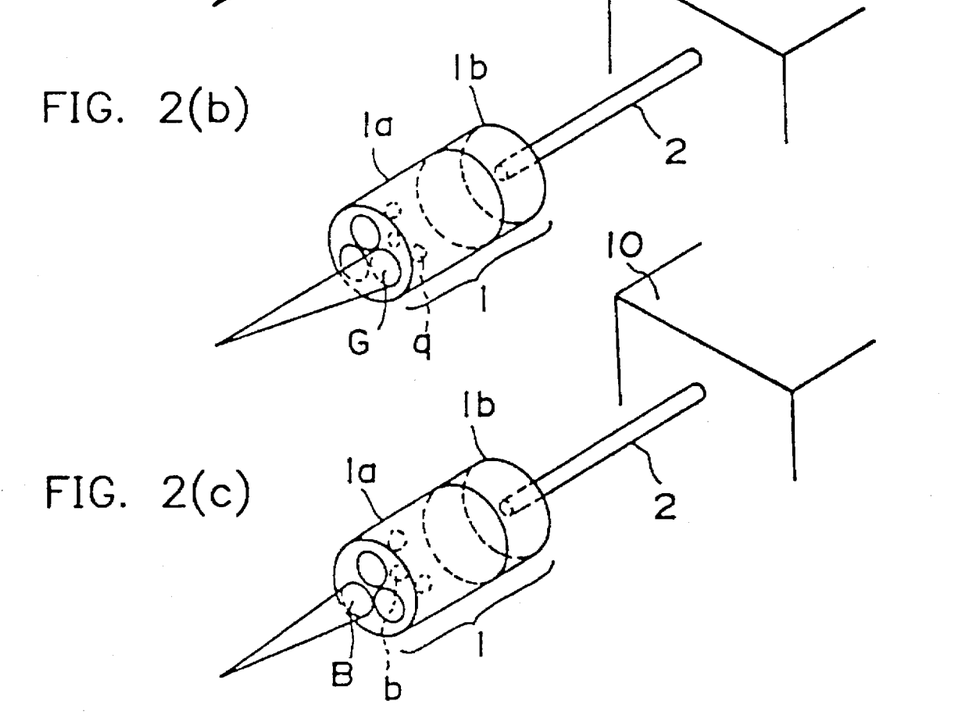

Light source 1 comprises three light emitting units r, g and b and red (R), green (G) and blue (B) filters corresponding to said light emitting units, and consists of light emitting source 1a capable of emitting light in three primary colors constructed as a single integral unit with gyro 1b, as shown in FIGS. 2(a), 2(b), and 2(c). Light source 1 is fixed to camera body 10 by means of supporting member 2. Therefore, when there is vibration because camera body 10 is shaken, for example, light source 1 attempts to remain stationary due to its inertia. When this happens, the elasticity of supporting member 2 is damped by a substance such as rubber, so that supporting member 2 does not hinder the inertia of light source 1 and generate unnecessary resonance.

In other words, light source 1 stays stationary regardless of the vibration of camera body 10. This means that light source 1 moves relative to camera body 10 and the locus of that movement corresponds to the locus of the vibration of camera body 10. The vibration of camera body 10 therefor can be recorded on film (not shown in the drawing) by having the locus of the movement of light source 1 exposed onto film. If the inertia of light emitting source 1a is adequate, gyro 1b may be omitted.

Figure 3:
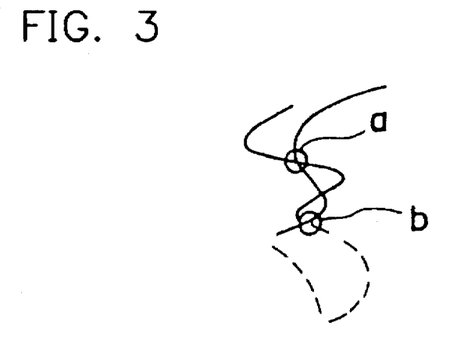
FIG. 3 shows how the devices shown in FIG. 2 perform shake recording.
Figure 8:
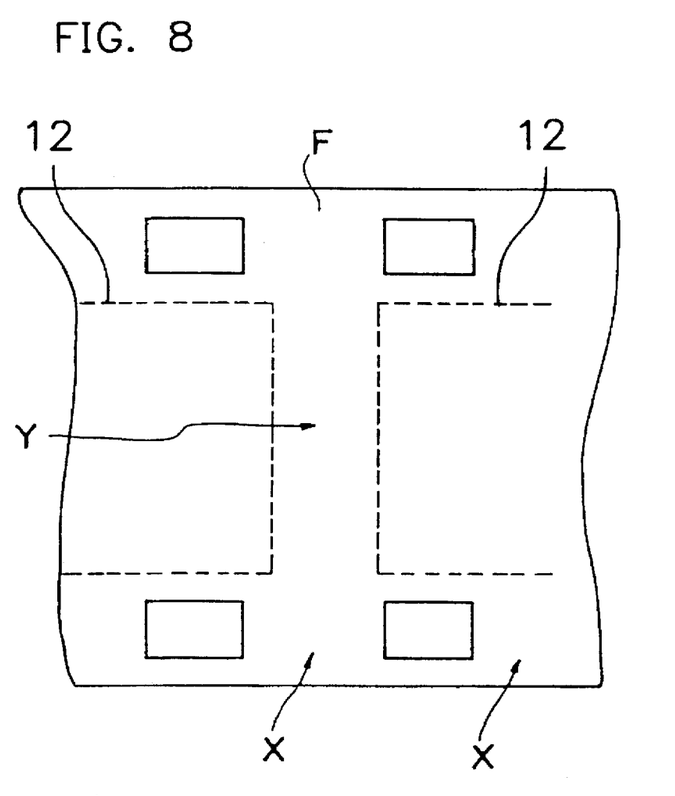
FIG. 8 shows recording areas in each of said embodiments.
Figures 9A, 9B, 9C:
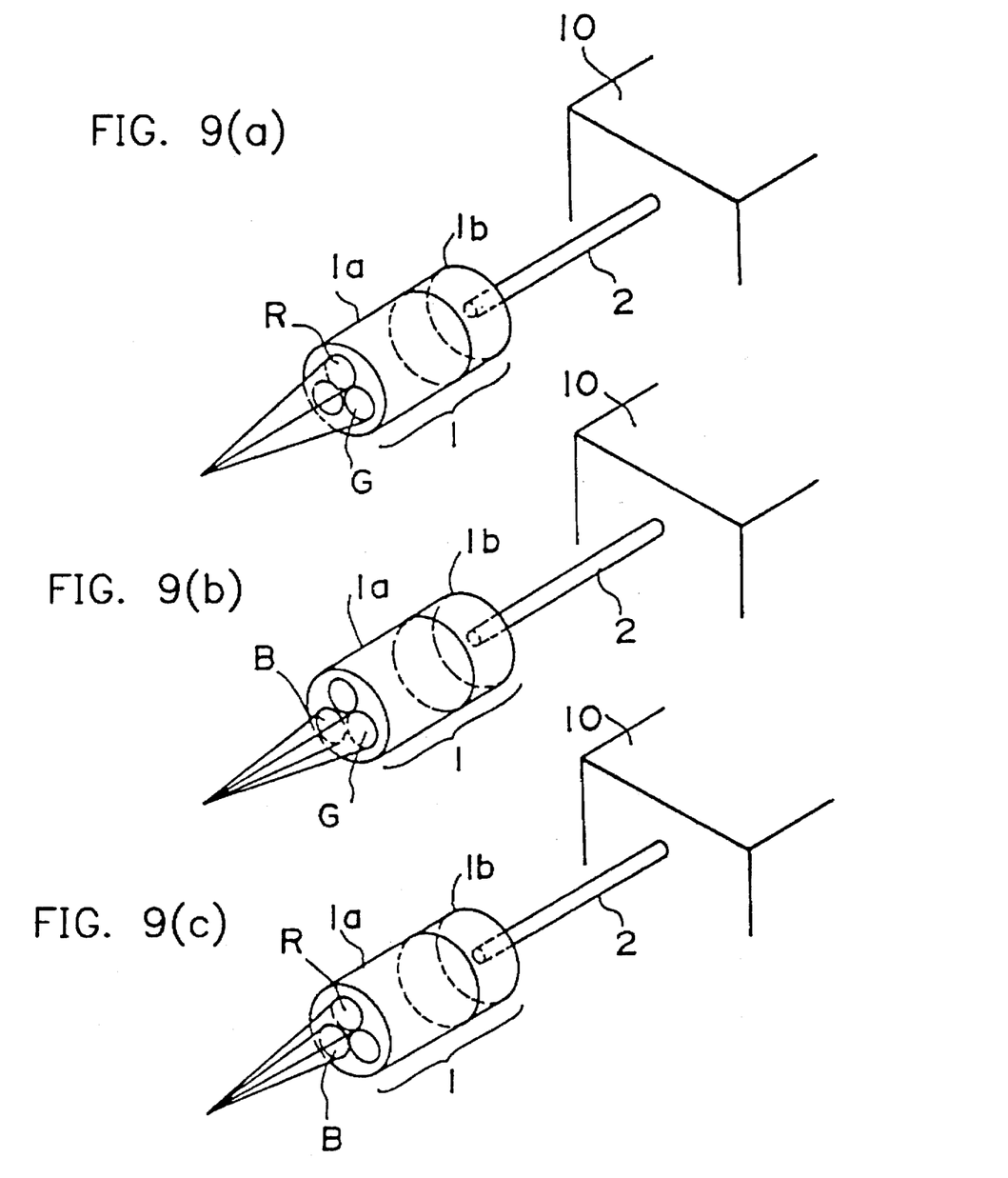
FIGS. 9(a), 9(b), 9(c), 10, and 11 show modified versions of the first embodiment.

The manner in which the recording on the film takes place will now be explained. FIG. 3 shows the locus recorded on the film. Preferably, as shown in FIG. 8, the areas of the film F on which the recording takes place should be areas Y between frames or areas X where perforations are, or in other words, areas which are not used for regular photo-taking.

Light source 1 projects a spot beam on the recording area of the film F outside photo-taking frame 12 during the photo-taking operation. Moreover, as this projection takes place, the wavelength of said beam is caused to change over time in a predetermined pattern. This pattern may comprise the sequential projection of the three primary colors one after another as shown in FIG. 2(a), FIG. 2(b), and FIG. 2(c), or the patterns may be made more complex by combining the three primary colors of the light emitting units and projecting multi-colored light as shown in FIGS. 2(a), 2(b), and 2(c). This is the process for clear recording of the beginning and the end of the locus.

The manner in which the shake is analyzed after development of the film will be explained. These operations take place in accordance with the flow chart shown in FIG. 4. In this drawing, steps #2 through #24 occur inside the camera. In steps #2 and #5, the shutter of the camera opens by means of an instruction to perform photo-taking and recording commences. In step #10, while the shutter is open, light having the three primary colors, i.e., red, green and blue, is projected from light source 1 to an area outside the image frame in the manner shown in FIGS. 2(a), 2(b), and 2(c). After the shutter closes in step #10, the recording performed by means of this light source 1 comes to an end (step #15). The switching of red, green and blue light takes place at intervals of one third of the manually or automatically preset time during which the shutter is open, for example.

Figure 10:
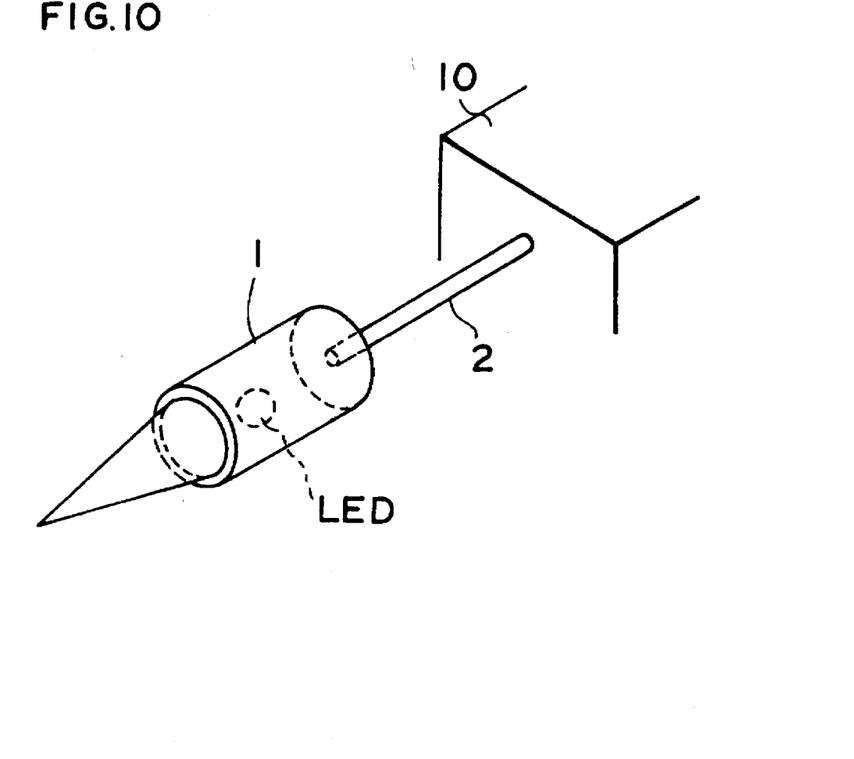
Figure 11:
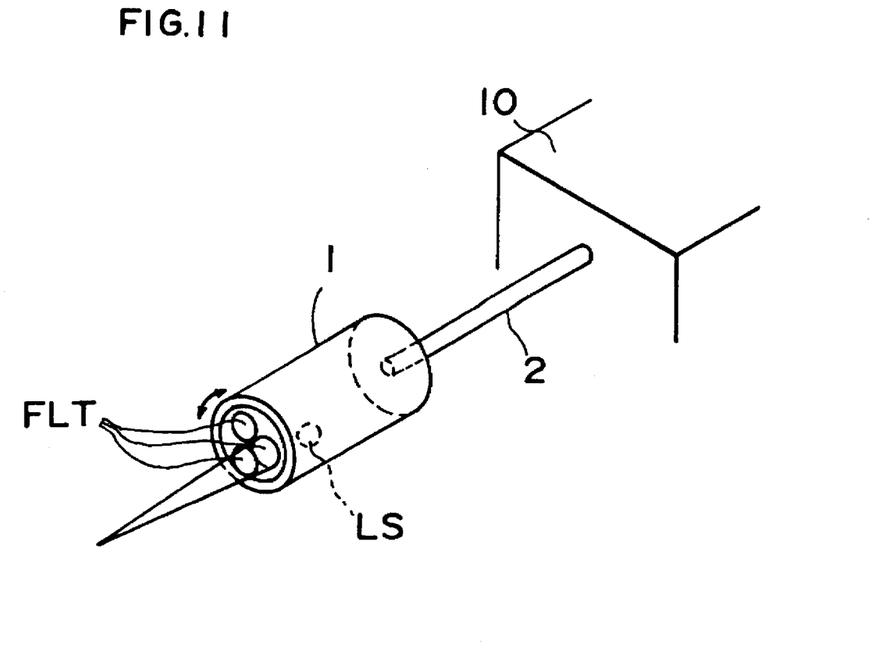

In the embodiment described above, light source 1 has multiple light emitting units and each light emitting unit has a red, green or blue filter. However, a light emitting diode (LED) capable of outputting light having more than one color, as shown in FIG. 10, or an RGB filter FLT and one light emitting unit LS, where the filter can rotate to switch positions as indicated by the arrow in FIG. 11, may be used as the light source.

Figure 4:
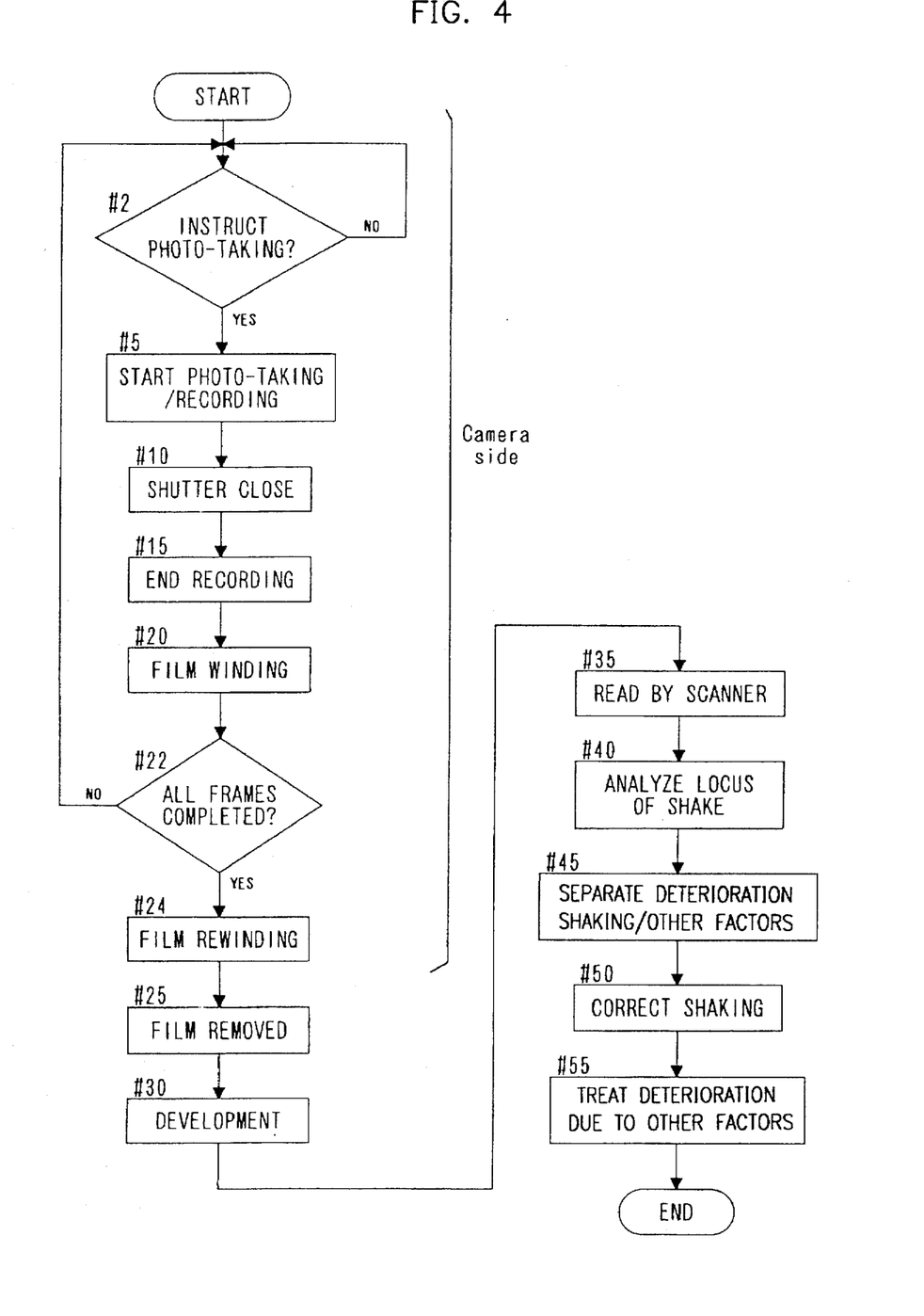
FIG. 4 is a flow chart showing the operations pertaining to the shake recording performed by the devices and equipment of the first embodiment as well as the operations pertaining to other devices that employ said recording.

After photo-taking and transference operations are performed as described above for all frames of the film placed in the camera (step #22), the film is rewound in step #24. The film is removed from camera body 10 in step #25 and is developed in step #30. Then, in step #35, the film is read by a scanner such that the image data and the locus data recorded in the above fashion are numerized.

In step #40, the shaking of camera body 10 is analyzed sequentially from the locus of shake as shown in FIG. 3 in the area where the shaking was recorded. In this analysis, the X coordinate (horizontal direction), Y coordinate (vertical direction) and color C (time direction) are deemed to be one group, and their values (X, Y, C) are read.

The group of data (X1-n, Y1-n, C1-n) thus read from the recording area is realigned based on the continuity of the X and Y coordinates and color C. This realignment is performed in accordance with a prescribed pattern at the time of transference as shown in Table 1 below, for example.

TABLE 1

| Original data | Realigned data |
| --- | --- |
| (X1, Y1, C1) | (X8, Y8, C8) |
| (X2, Y2, C2) | (Xn, Yn, Cn) |
| . | . |
| . | . |
| . | . |
| (Xn, Yn, Cn) | (X2, Y2, C2) |

It is learned from the data indicated above that the locus of the movement of the camera body is (X8, Y8)–(Xn, Yn)– . . . (X2, Y2). If the locus has intersecting points such as points a and b as shown in FIG. 3, the locus of the movement of camera body 10 can be sequentially converted without difficulty by carrying out the following processing prior to realignment.

Since light rays having different wavelengths at the time of transference overlap at points a and b, points a and b have colors having wavelength distributions different from the prescribed wavelengths at the time of transference. Therefore, these colors should be separated into colors that correspond to the wavelengths at the time of transference as shown below, for example, in the almost same manner as Table 1.

| (Xi, Yi, Ci) | (Xi, Yi, Ci α) |
| --- | --- |
|  | (Xi, Yi, Ci β) |

Returning to FIG. 4, image deterioration due to shaking and image deterioration due to other factors are separated in step #45. Deterioration due to the shaking is then corrected in step #50 through image processing, and deterioration due to other factors is treated in step #55 in accordance with selections made by the user through public-domain image processing such as defocus correction, cross filter effect, soft focus effect, panned background, as well as swings and tilts, before the film is made into prints.

Figure 5:
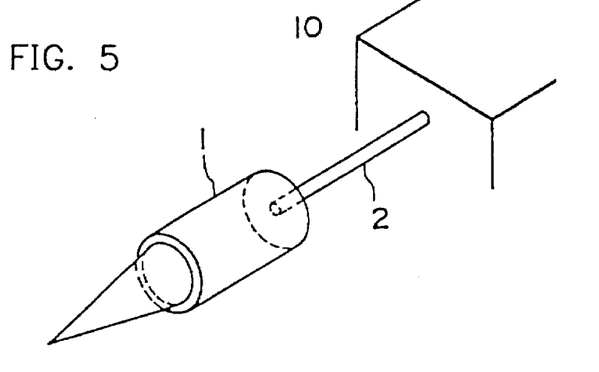
FIG. 5 shows important parts of devices and equipment of a second embodiment of the present invention.

FIG. 5 shows the construction of important parts of an image sensing device of a second embodiment of the present invention. This embodiment is characterized in that one color light ray is emitted while three colors, i.e., red, green and blue, were used in the first embodiment. In the drawing, light source 1 projects a spot beam onto the recording area outside the photo-taking frame of the film during photo-taking. This projection takes place while the brightness of the spot beam is made to vary over time based on a predetermined pattern.

In this embodiment, in step #40 in FIG. 4 the shaking of camera body 10 is sequentially analyzed from the locus of shake in the area where the shaking was recorded. In this analysis, the X coordinate (lateral direction), Y coordinate (vertical direction) and brightness N (time direction) are deemed to be one group, and their values (X, Y, N) are read.

The group of data (X1-n, Y1-n, N1-n) thus read from the recording area is realigned based on the continuity of the X and Y coordinates and brightness N. This realignment is made in accordance with a prescribed pattern at the time of transference as shown in Table 2 below, for example.

TABLE 2

| Original data | Realigned data |
|---|---|
| (X1, Y1, N1) | (X8, Y8, N8) |
| (X2, Y2, N2) | (Xn, Yn, Nn) |
| . | . |
| . | . |
| . | . |
| (Xn, Yn, Nn) | (X2, Y2, N2) |

It is learned from the data indicated above that the locus of the movement of the camera body is (X8, Y8)–(Xn, Yn)–... (X2, Y2). If the locus has intersecting points such as points a and b as shown in FIG. 3, the locus of the movement of camera body 10 can be sequentially converted without difficulty by carrying out the following processing prior to realignment.

Since light rays having different brightnesses at the time of transference overlap at points a and b, points a and b have brightnesses with brightness distributions different from the prescribed brightness at the time of transference. Therefore, these brightnesses should be separated into brightnesses that correspond to the brightnesses at the time of transference as shown below, for example.

| (Xi, Yi, Ni) | (Xi, Yi, Ni α) |
|---|---|
|  | (Xi, Yi, Ni β) |

Incidentally, these first and second embodiments may be combined such that the locus data becomes (Xi, Yi, Ni, Ci) and the wavelength and brightness of the light beam may be varied during recording.

Figure 6A:
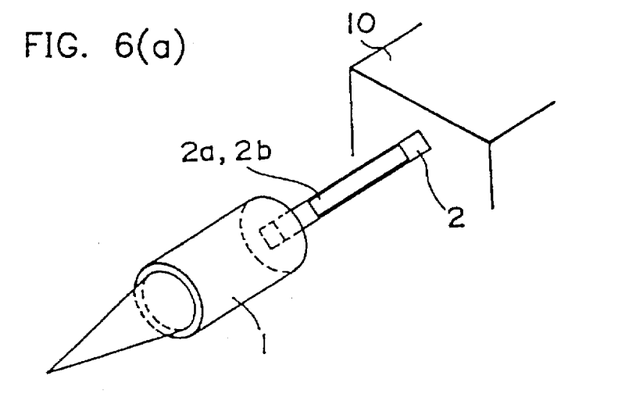
FIGS. 6(a) and 6(b) show important parts of devices and equipment of a third embodiment of the present invention.
Figure 6B:
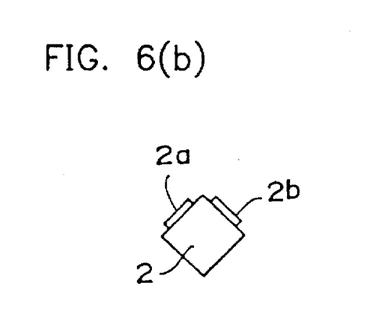
Figure 12:
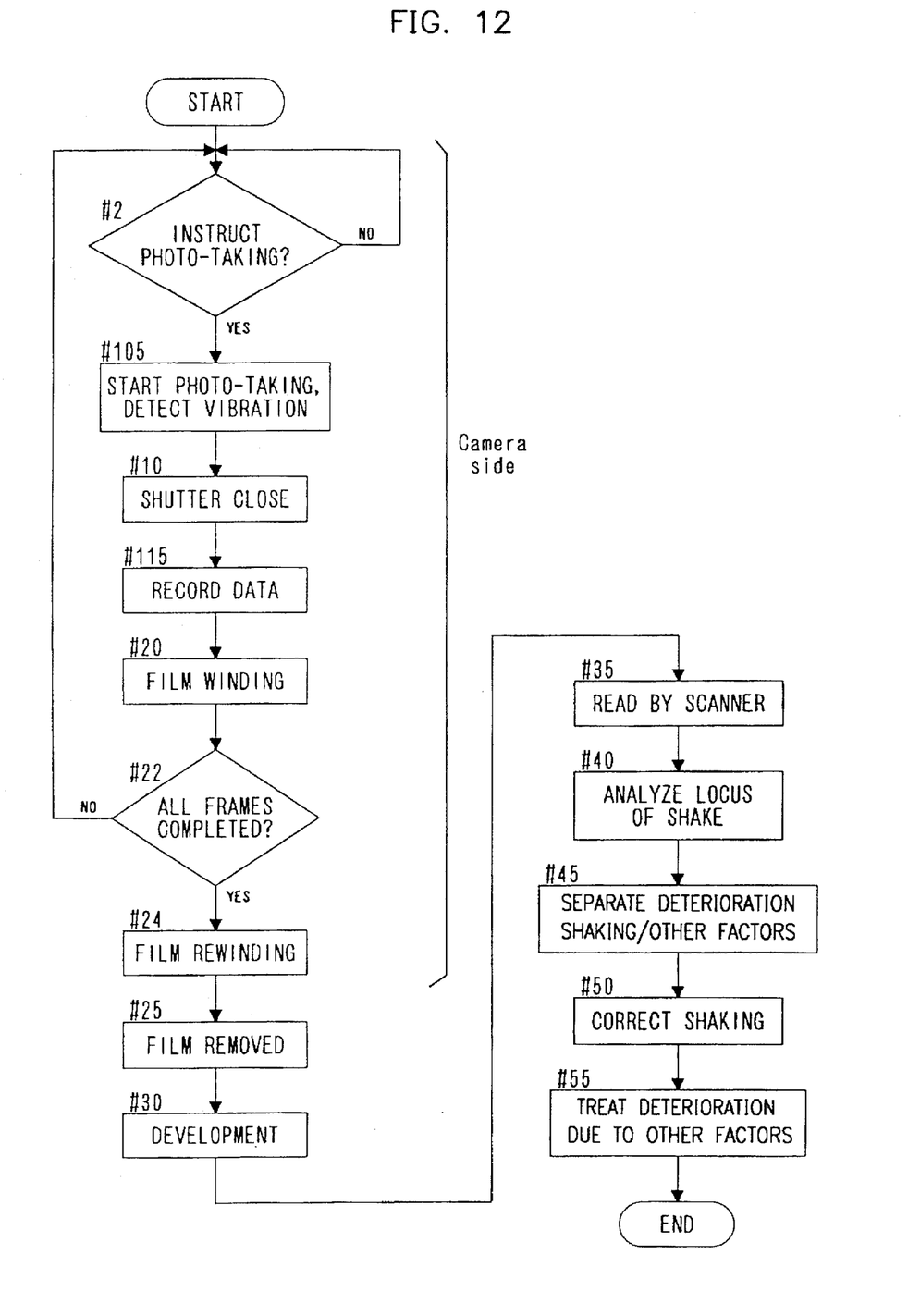
FIG. 12 is a flow chart showing the operations in the third embodiment.

FIG. 6(a) shows the construction of important parts of the image sensing device of a third embodiment of the present invention, and FIG. 12 is a flow chart showing the operations pertaining to said embodiment. In FIG. 6(a), piezoelectric elements 2a and 2b are attached to supporting member 2 that holds light source 1. When vibration due to the shaking of the user's hands is detected (step #105), light source 1 does not emit light, but supporting member 2 is made to oscillate by means of these piezoelectric elements 2a and 2b so that stationary waves are excited in supporting member 2 and supporting member 2 may be used as an angular acceleration sensor, by which the vibration of camera body 10 is recorded in a memory. (b) of FIG. 6 shows the positions where piezoelectric elements 2a and 2b are attached to supporting member 2.

Figure 7:
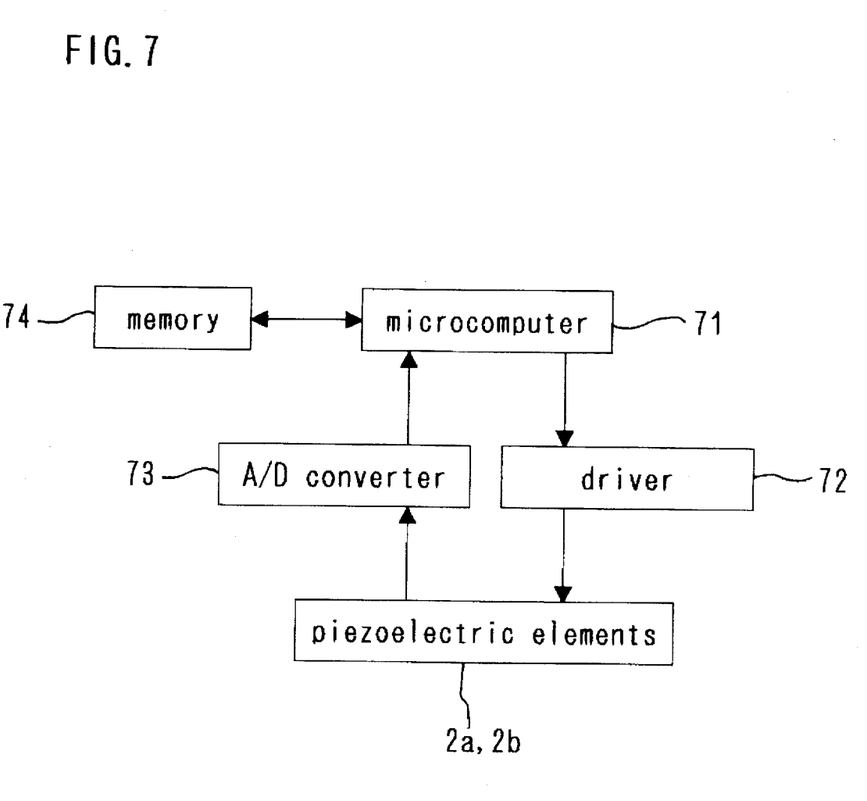
FIG. 7 is a block diagram of a circuit to activate the devices of the third embodiment.

A circuit for such a construction may be easily made as shown in the block diagram shown in FIG. 7. In FIG. 7, 71 is a microcomputer, 72 is a driver for the piezoelectric elements, 73 is an analog to digital converter (hereinafter 'A/D converter') and 74 is a memory.

Microcomputer 71 drives piezoelectric elements 2a and 2b by sending drive signals to driver 72. It drives supporting member 2 and piezoelectric elements 2a and 2b, which work as a bimorph actuator. Piezoelectric elements 2a and 2b thereby function as angular acceleration sensors and their output is inputted to microcomputer 71 via A/D converter 73 and saved in memory 74.

After the above processes are carried out, and after the completion of exposure of the film (step #10), light source 1 projects a spot beam to the recording area outside the photo-taking frame of the film based on the vibration data of camera body 10 (step #115), which was recorded in memory 74 before the film was rewound. When this happens, piezoelectric elements 2a and 2b drive supporting member 2 via driver 72 in accordance with the wave forms recorded in memory 74. When this happens, the light generated by light source 1 may change both its wavelength and brightness or either its wavelength or brightness alone. The processes carried out subsequently are the same as in the first or second embodiment.

In this embodiment, the conditions of the vibration are converted into vibration data comprising electric signals and recording on the film then takes place based on this vibration data, and since the detection member and recording member comprise one component, as opposed to a conventional model in which the vibration detection member and film recording member comprise two separate components, the construction may be made compact.

Using the embodiments as described above, because the light source changes its wavelength and/or brightness over time and the recording means records the light beam emitted from this light source on a recording medium, shaking can be detected and the amount and direction of the shaking can be recorded using a simple construction. This enables a simple construction in which the light source is mounted to the camera body through an elastic means to record on film all shaking that occurs during exposure of the film in the image sensing device. Therefore, positional changes can be easily sought from the relationship between the recorded color or density and time.

In addition, since the light source is held by a supporting member such that its position relative to the recording medium may change, shaking can be detected and the amount and direction of the shaking can be recorded using a simple construction.

The detection means detects the change in position of the light source relative to the recording medium and the position changing means changes the position of the light source via the supporting member in accordance with the output of said detection means, as a result of which shaking can be detected and the amount and direction of the shaking can be recorded using a simple construction.

The detection means and position changing means contain piezoelectric elements, as a result of which shaking can be detected and the amount and direction of the shaking can be recorded using a simple construction.

Incidentally, the embodiments and modifications above represent the present invention as applied in a camera shown in FIG. 1, but the present invention is not limited to the same. It may also be applied in equipment that performs image sensing while moving such as car-mounted cameras and aerial cameras, for example.

It can also be used in equipment to detect and record various data other than images in order to compensate for errors occurring due to physical vibrations applied to the equipment. For example, it can be used in a device which records data on a roll of paper using a pen.

Further, the present invention can also be used for the detection and recording of the vibration of a building or vehicle, or in equipment that tests the effect of an impact applied to an object.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An apparatus having a shake recording device, said apparatus comprising:
   a data recorder for recording data;
   a light source which emits a light to a photosensitive medium so as to record on the medium a locus of shake of the apparatus; and
   a controller which controls said light source to alter, over time in a predetermined pattern, a color of the light being emitted by said light source during a recording of data by said data recorder so that the thus recorded locus of shake represents an error in the data recorded by said data recorder due to shaking of the apparatus.

2. An apparatus as recited in claim 1, wherein said light source includes a plurality of light emitters and a plurality of color filters, and wherein said controller activates said light emitters in turn in accordance with said predetermined pattern.

3. An apparatus as recited in claim 1, wherein said light source includes a light emitter and a plurality of color filters which are exchangeable arranged, and wherein said controller alters the color of the light emitted by the light emitter by exchanging the color filters in accordance with said predetermined pattern.

4. An apparatus as recited in claim 1, wherein said light source includes a light emitting diode which is capable of outputting light having more than one color, and wherein said controller changes in said predetermined pattern the color of light being emitted by said light emitting diode.

5. An apparatus as recited in claim 1, further comprising a support member which elastically supports said light source.

6. An apparatus as recited in claim 1, further comprising a piezoelectric element which provides a signal which shows the locus of shake of the apparatus, and a memory which memorizes the signal provided by said piezoelectric element.

7. An apparatus as recited in claim 6, wherein said memory outputs the memorized signal, and wherein said piezoelectric element is driven by the memorized signal outputted from said memory.

8. A shake recording device which is suitable for being provided in an apparatus having a data recorder, wherein the shake recording device can record shake of the apparatus, said shake recording device comprising:
   a light source which emits a light to a photosensitive medium so as to record on the medium a locus of shake of the apparatus; and
   a controller which controls said light source to alter, over time in a predetermined pattern, a color of the light being emitted by said light source during a recording of data by the data recorder so that the thus recorded locus of shake represents an error in the data recorded by the data recorder.

9. A shake recording device as recited in claim 8, wherein said light source includes a plurality of light emitters and a plurality of color filters, and wherein said controller activates said light emitters in turn in accordance with said predetermined pattern.

10. A shake recording device as recited in claim 8, wherein said light source includes a light emitter and a plurality of color filters which are exchangeably arranged, and wherein said controller changes the color of light emitted by said light source by exchanging the color filters in accordance with said predetermined pattern.

11. A shake recording device as recited in claim 8, wherein said light source includes a light emitting diode which is capable of outputting light having more than one color, and wherein said controller changes in said predetermined pattern the color of light being emitted by said light emitting diode.

12. A shake recording device as recited in claim 8, further comprising a support member which elastically supports said light source.

13. A shake recording device as recited in claim 8, further comprising a piezoelectric element which provides a signal which shows the locus of shake of the apparatus, and a memory which memorizes the signal provided by said piezoelectric element, and wherein said memory outputs the memorized signal, and wherein said piezoelectric element is driven by the memorized signal outputted from said memory.

14. A system including a recording section which records data and a reproducing section which reproduces the recorded data, said system comprising:
   a recorder which records the data;
   a light source which emits a light to a photosensitive medium so as to record on the medium a locus of shake of the recording section;
   a controller which controls said light source to alter a color of the emission light;
   a reader which reads the locus of shake recorded on said medium; and
   a correction device which corrects the recorded data by means of the thus read locus of shake; and
   a reproducer which reproduces the thus corrected data.

15. A system as recited in claim 14, wherein said data is a photographed image.

16. A system as recited in claim 15, wherein said recording section is a photographic camera.

17. A system as recited in claim 16, wherein said data is recorded on a photosensitive film.

18. A system as recited in claim 17, wherein said medium is the photosensitive film.

19. A system as recited in claim 15, wherein said correction device corrects the recorded data by image processing.

20. A system as recited in claim 14 further comprising a support member which elastically supports said light source.

21. A system including a recording section which records data and a reproducing section which reproduces the recorded data, said system comprising:
   a recorder which records the data;
   a light source which emits a light to a photosensitive medium so as to record on the medium a locus of shake of the recording section;
   a controller which controls said light source to alter, over time in a predetermined pattern, the light emitted by said light source during the recording of the data;
   a reader which reads the locus of shake recorded on said medium; and
   a correction device which corrects the recorded data by means of the thus read locus of shake; and
   a reproducer which reproduces the corrected data.

22. A system as recited in claim 21, wherein said recording section is a photographic camera, wherein the medium is a photosensitive film in said photographic camera, wherein said data is a photographed image, and wherein the light emitted by said light source is recorded on the photosensitive film in the photographic camera separately from a recording of said data on the photosensitive film.

23. A system as recited in claim 21, wherein said controller varies over time a color of the light emitted by said light source in accordance with said predetermined pattern.

24. A system as recited in claim 21, wherein said controller varies over time a brightness of the light emitted by said light source in accordance with said predetermined pattern.

25. An apparatus as recited in claim 1, wherein said data recorder records image data.

26. An apparatus as recited in claim 25, wherein said data recorder records the image data on the medium separately from the recording on the medium of the locus of shake of the apparatus.

27. An apparatus as recited in claim 26, wherein the apparatus is a photographic camera, wherein the medium is a photosensitive film in said photographic camera, wherein said data is a photographed image, and wherein the light emitted by said light source is recorded on the photosensitive film in the photographic camera separately from a recording of said data on the photosensitive film.

* * * * *

UNITED STATES PATENT AND TRADEMARK OFFICE
CERTIFICATE OF CORRECTION

PATENT NO. : 5,689,737
DATED : November 18, 1997
INVENTOR(S) : Tetsuro Kanbara

It is certified that error appears in the above-identified patent and that said Letters Patent is hereby corrected as shown below:

Column 7, line 21, delete "exchangeable" and insert --exchangeably--.

Column 8, line 24, delete "emission" and insert --thus emitted--.

Column 8, line 30, delete "is" and insert --are--.

Column 8, line 34, delete "is" and insert --are--.

Column 8, line 61, delete "is" and insert --are--.

Column 10, line 4, delete "is" and insert --are--.

Signed and Sealed this

Fifteenth Day of September, 1998

Attest:

BRUCE LEHMAN

*Attesting Officer*  *Commissioner of Patents and Trademarks*